(12) United States Patent
Elwell

(10) Patent No.: US 10,823,378 B1
(45) Date of Patent: Nov. 3, 2020

(54) CANDLE HOLDER AND METHOD FOR SECURING A CANDLE HOLDER TO A VERTICAL SURFACE

(71) Applicant: Jean D. Elwell, Roscoe, IL (US)

(72) Inventor: Jean D. Elwell, Roscoe, IL (US)

(*) Notice: Subject to any disclaimer, the term of this patent is extended or adjusted under 35 U.S.C. 154(b) by 0 days.

(21) Appl. No.: 16/741,533

(22) Filed: Jan. 13, 2020

Related U.S. Application Data

(63) Continuation-in-part of application No. 29/705,342, filed on Sep. 11, 2019.

(51) Int. Cl.
*F21L 19/00* (2006.01)
*F21V 35/00* (2006.01)
*F21V 21/092* (2006.01)
*F16B 47/00* (2006.01)

(52) U.S. Cl.
CPC ........... *F21V 21/092* (2013.01); *F16B 47/00* (2013.01); *F21V 35/00* (2013.01)

(58) Field of Classification Search
CPC . F16B 47/00–006; F21V 21/092–0925; F21V 35/00–006
USPC ......... 362/157–170, 392–393, 447, 569, 810
See application file for complete search history.

(56) References Cited

U.S. PATENT DOCUMENTS

| | | | |
|---|---|---|---|
| 1,073,013 A * | 9/1913 | Andres | F21V 35/00 431/292 |
| 5,028,026 A | 7/1991 | Philipps et al. | |
| 5,422,803 A * | 6/1995 | Kilgore | F21S 6/001 248/205.5 |
| D371,735 S | 7/1996 | Motta | |
| 6,092,772 A | 7/2000 | Garcia et al. | |
| 7,553,041 B1 * | 6/2009 | Terhune | F21V 35/00 362/101 |
| 7,651,063 B2 | 1/2010 | Jensen | |
| 2018/0163936 A1 * | 6/2018 | Hazzard | F21S 9/02 |

* cited by examiner

Primary Examiner — Jason M Han
(74) Attorney, Agent, or Firm — Scherrer Patent & Trademark Law, P.C.; Stephen T. Scherrer; Monique A. Morneault

(57) ABSTRACT

The present disclosure relates to a holder, and specifically a holder for a traditional flame candle or a flameless, battery-operated candle. The present holder permits the candle to be positioned directly on a vertical surface, such as a window, and spaced away from the vertical surface while maintaining the candle in the horizontal position. The present holder and its associated method for placement provides different decorating options not available using traditional candle holders placed on a horizontal surface.

12 Claims, 5 Drawing Sheets

CANDLE HOLDER AND METHOD FOR SECURING A CANDLE HOLDER TO A VERTICAL SURFACE

TECHNICAL FIELD

The present disclosure relates to a holder for a candle, and specifically a holder capable of attaching and detaching to a vertical surface, while maintaining the holder and its candle in the horizontal position. The present candle holder and method for positioning the holder and its candle offers decorating options for placement of candles in different locations.

BACKGROUND

Candles, whether traditional flame candles or battery-operated flameless candles are popular decorating items. Additionally, it is usually desirable to have some form of a decorative holder for the candles. Generally, candles within their holders are placed on a flat horizontal surface, such as a table, ledge or shelf. It is sometimes desirable for decorating purposes to have the ability to place candles in unusual places, such as in a window, on a picture, or on another vertical surface. For example, candles are often placed in windows during holidays, or sometimes in memoriam or as another form of tribute. However, again, placement of such candles is traditionally limited to a flat, horizontal surface.

Therefore, there is a need to have the option to place candles and their holders in different locations apart from the traditional horizontal surface. For example, there may be a need to secure a candle in its holder on a smooth vertical surface, such as on a window and maintain the candle in the horizontal position. Alternatively, it may be desirable as a decorating feature to place a candle in its holder on the glass of a picture or photograph. The present disclosure provides a solution to these decorating needs.

SUMMARY

The present disclosure relates to a holder, and specifically a holder for a traditional flame candle or a flameless, battery-operated candle. The present holder permits the candle to be positioned on a non-traditional vertical smooth surface, such as directly on the surface of a window, and maintains the candle in the horizontal position.

To this end, in an embodiment of the present disclosure, a candle holder is provided. The candle holder includes a base having an upper wall and an opposing bottom wall, the upper wall and the bottom wall connected by a side wall or side walls, a receptacle on the upper wall adapted for holding a candle, and, an attachment device extending from the side wall of the base.

In an embodiment, the base has a square shape formed from the upper wall, opposing bottom wall and a plurality of side walls.

In an embodiment, the base has a rectangular shape formed from the upper all, opposing bottom wall and a plurality of side walls.

In an embodiment, the base has a circular shape formed from the upper wall, opposing bottom wall and a continuous side wall.

In an embodiment, the base has an oval shape formed from the upper wall, opposing bottom wall and a continuous side wall.

In an embodiment, the upper wall has a flat surface.

In an embodiment, the receptacle is centered on the flat surface of the upper wall.

In an embodiment, the receptacle includes a rail adapted for securing a candle.

In an embodiment, the receptacle is an indentation in the upper wall.

In an embodiment, the attachment device includes an arm extending horizontally from the side wall of the base.

In an embodiment, the arm includes a first end connected to the side wall, and a second end capable of receiving a fastening element for attaching the holder to a surface.

In an embodiment, the fastening element is a suction cup.

In another embodiment of the present disclosure a candle holder for securing a candle on a vertical surface is provided. The holder comprises a base having an upper wall and an opposing bottom wall, the upper wall and the bottom wall connected by a side wall, a plurality of receptacles on the upper wall, each receptacle adapted for holding a candle, and, at least one attachment device extending from the side wall of the base.

In an embodiment, the receptacles further include a rail for enclosing the candle within the receptacles.

In an embodiment, the attachment device comprises an arm extending outward from the side wall and a fastening element disposed on an opposing end of the arm.

In an embodiment, the fastening element secures the holder to a vertical smooth surface.

In another embodiment, a method for positioning a candle holder onto a vertical surface, is provided. The method comprises the steps of providing a holder adapted for receiving at least one candle, connecting a fastening element to the holder, positioning the holder in a horizontal position; and, attaching the holder to a vertical surface through the fastening element.

In an embodiment, the method further includes maintaining the holder and at least one candle in the horizontal position on the vertical surface.

In an embodiment, the method further includes detaching the holder from the vertical surface using the fastening element.

In an embodiment, the vertical surface includes a window surface.

It is, therefore, an advantage and objective of the present disclosure to provide an improved candle holder, and method for positioning the candle holder, offering a decorating option apart from the traditional horizontal surface placement.

It is further an advantage and objective of the present disclosure to provide an improved candle holder adapted for placement on a vertical surface while maintaining the candle and its holder in the horizontal position.

It is yet another advantage and objective of the present disclosure to provide an improved candle holder and method for placement of a candle on a vertical surface such as directly on a windowpane surface.

It is a further advantage and objective of the present disclosure to provide a method for easily attaching and detaching a candle holder onto a vertical surface to provide additional decorating and placement options from the standard horizontal surface for candle placement.

Additional features and advantages of the present disclosure are described in, and will be apparent from, the detailed description of the embodiments and from the drawings.

BRIEF DESCRIPTION OF THE DRAWINGS

The drawing figures depict one or more embodiments in accord with the present concepts, by way of example only.

DETAILED DESCRIPTION OF THE PRESENTLY PREFERRED EMBODIMENTS

The present disclosure relates to a holder, and specifically a holder for a traditional flame candle or a flameless, battery-operated candle, or a plurality of candles. The present holder permits the candle or candles to be positioned directly on a vertical surface, such as a windowpane, and spaced away from the vertical surface while maintaining the candle or candles in the horizontal position. The present holder and its associated method for placement, including easily attaching and detaching from a vertical surface, provides different decorating option from those of traditional candle holders placed on a horizontal surface.

Figure 1:
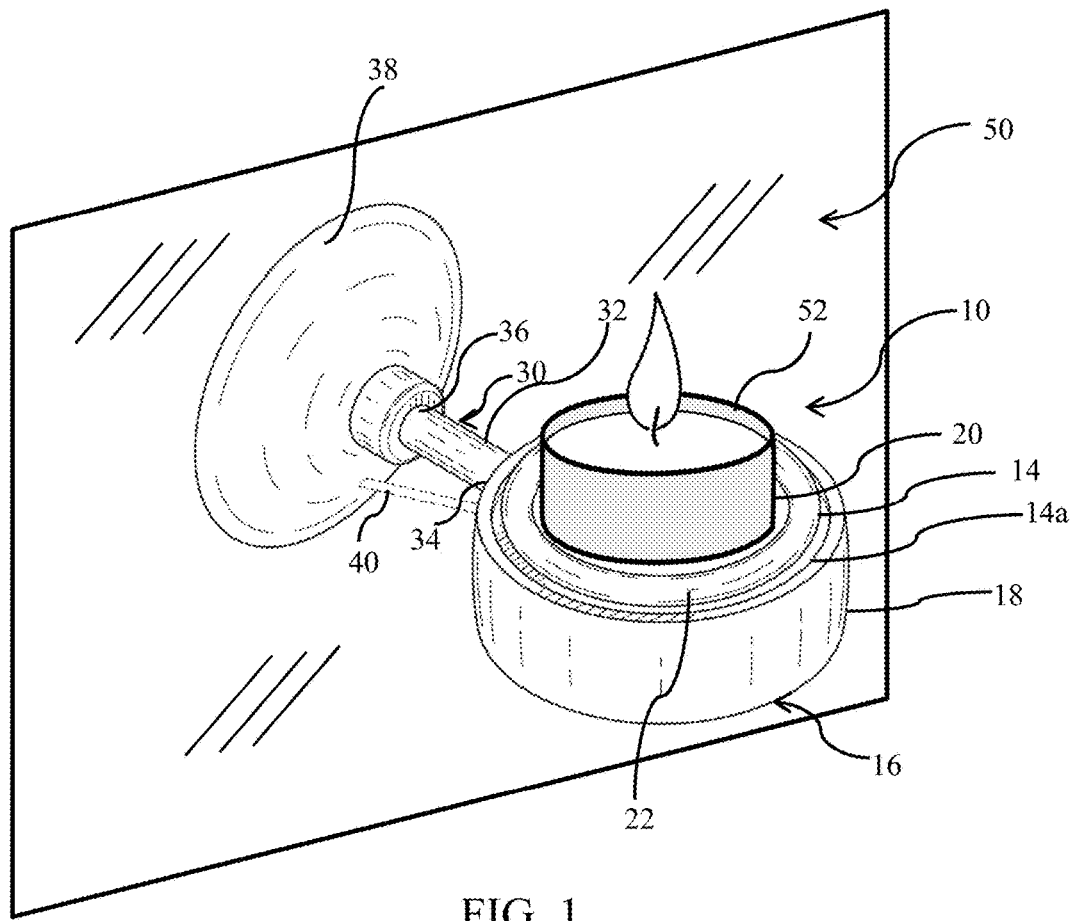
FIG. 1 illustrates a perspective view of an embodiment of a candle holder of the present disclosure in use on a window.
Figure 2:
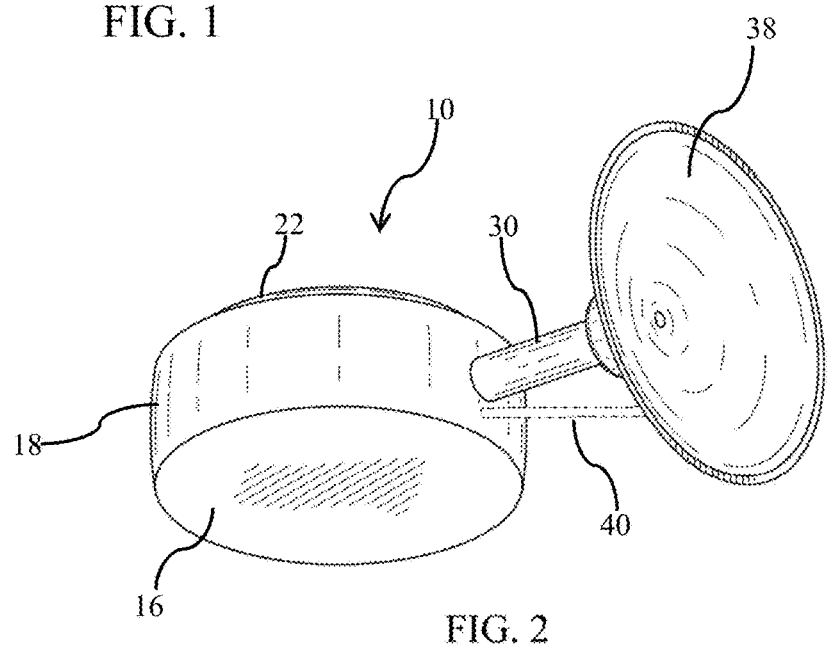
FIG. 2 illustrates a bottom view of the candle holder of FIG. 1.
Figure 3:
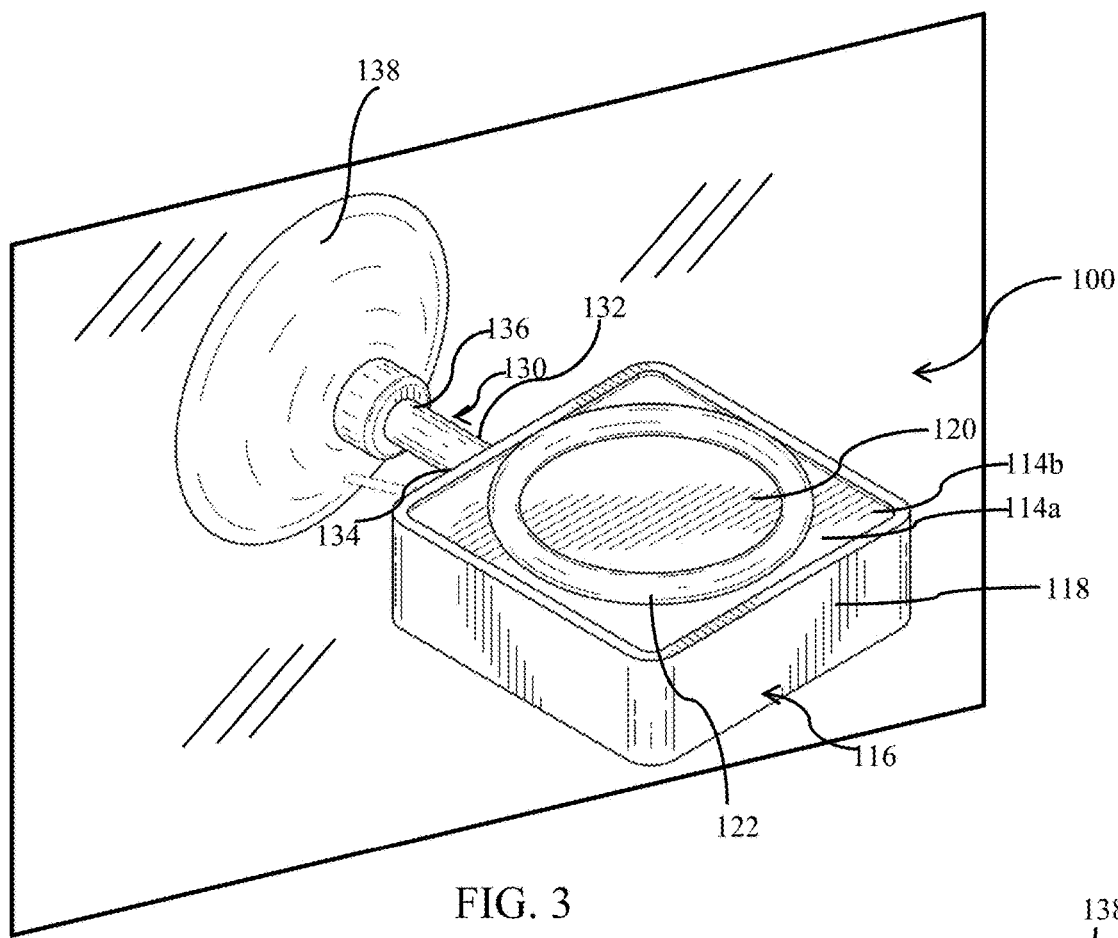
FIG. 3 illustrates a perspective view of another embodiment of a candle holder of the present disclosure.
Figure 4:
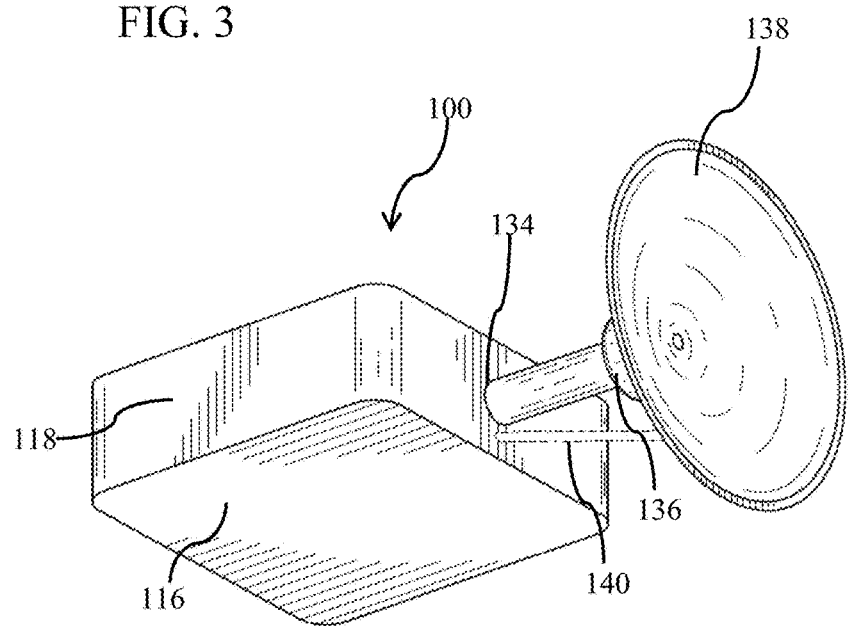
FIG. 4 illustrates a bottom view of the candle holder of FIG. 3.
Figure 5:
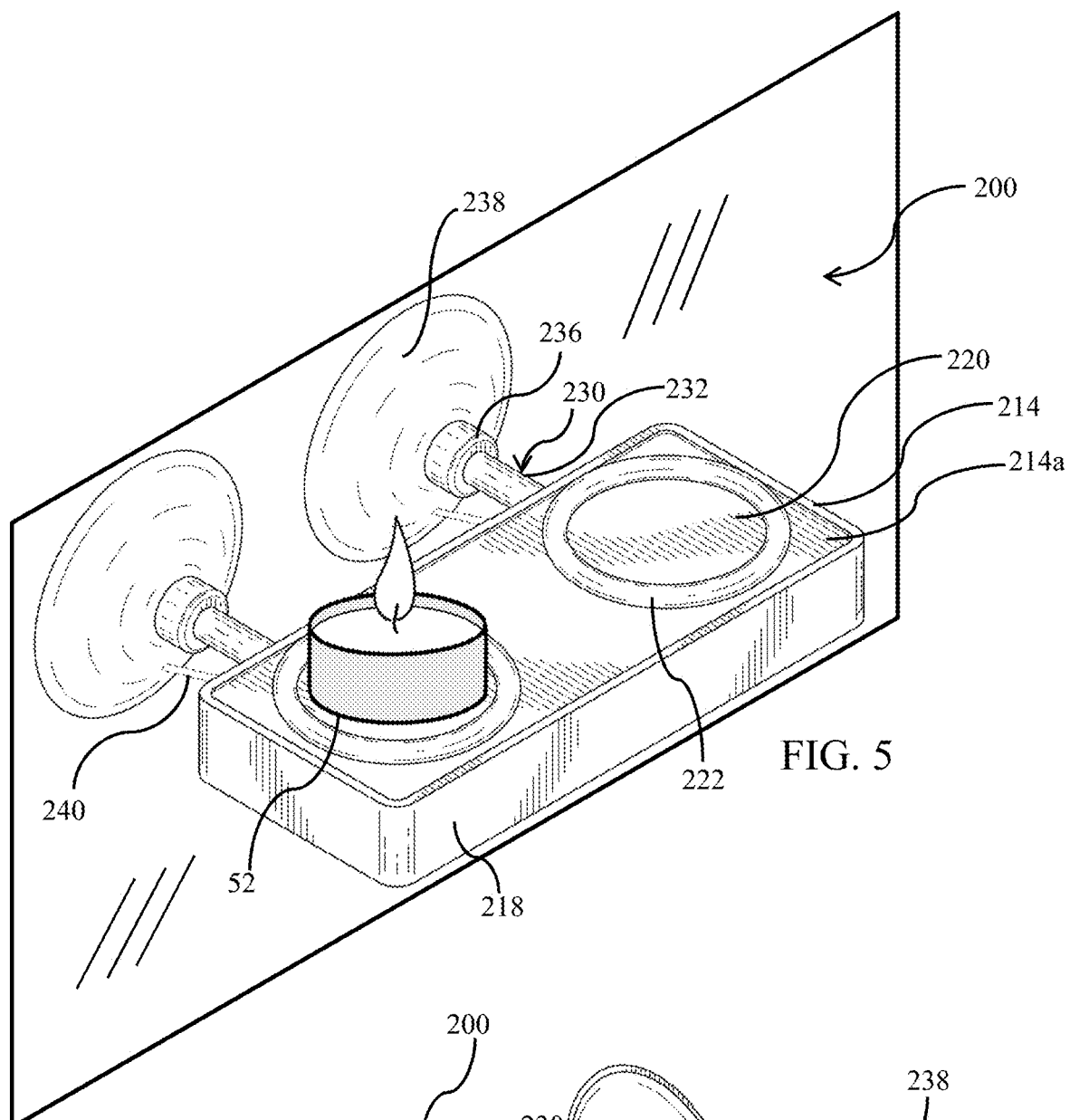
FIG. 5 illustrates yet another embodiment of a candle holder of the present disclosure.
Figure 6:
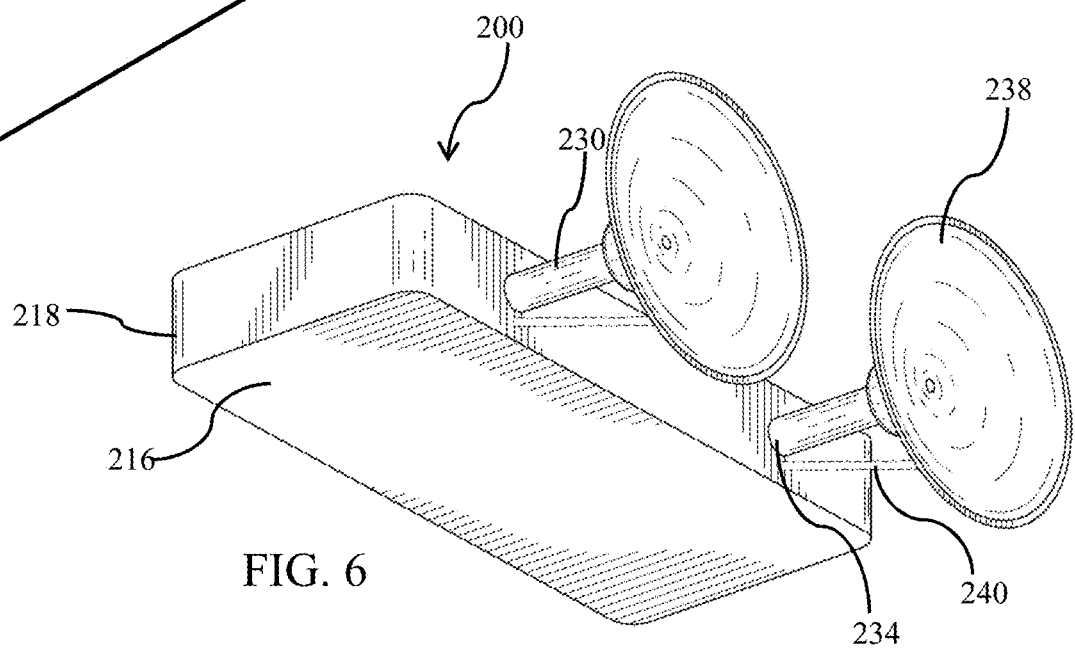
FIG. 6 illustrates a bottom view of the candle holder of FIG. 5.
Figure 7:
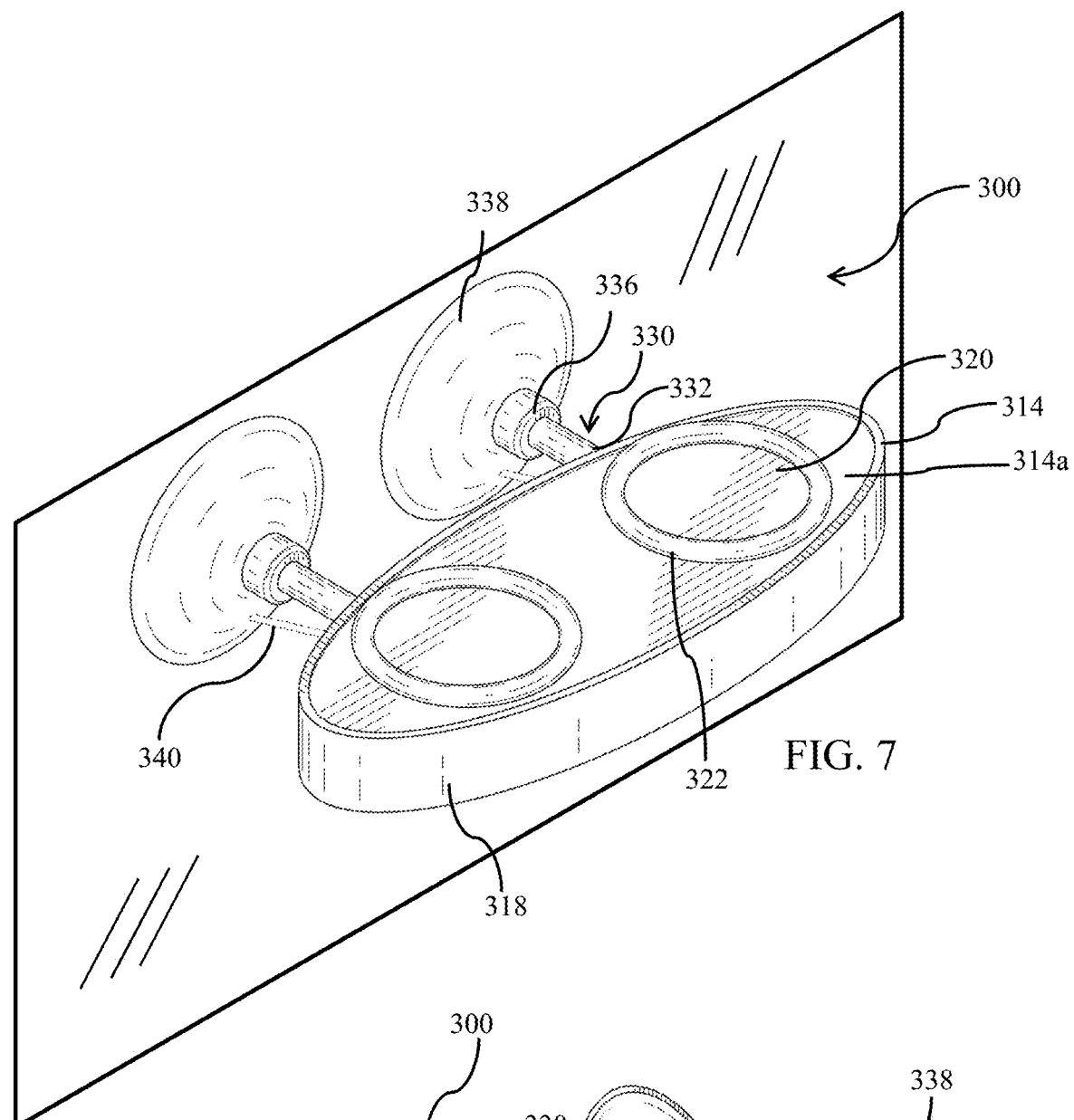
FIG. 7 illustrates a further embodiment of a candle holder of the present disclosure.
Figure 8:
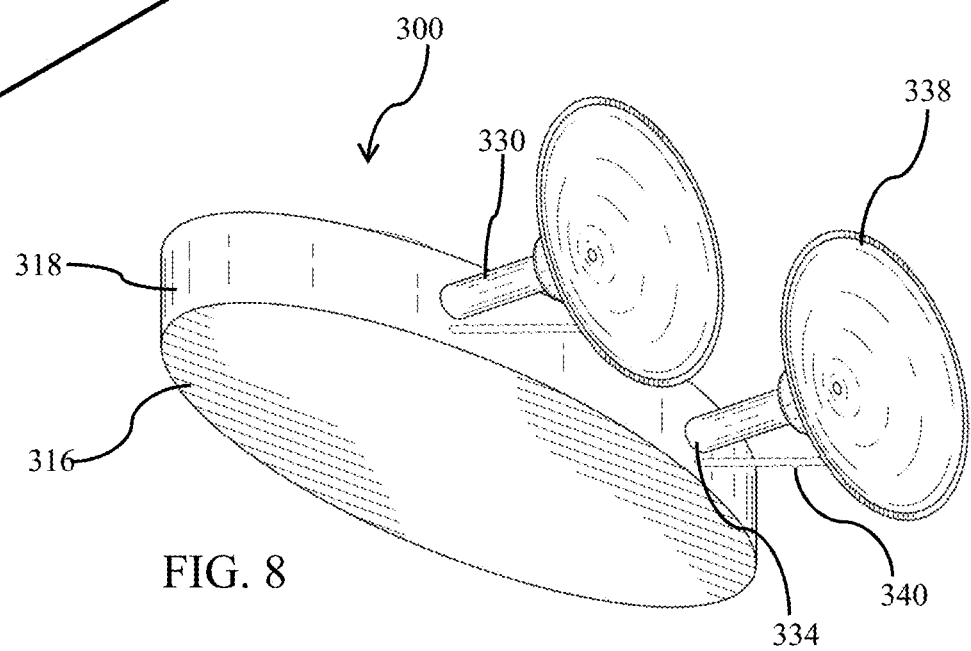
FIG. 8 illustrates a bottom view of the candle holder of FIG. 7.
Figure 9:
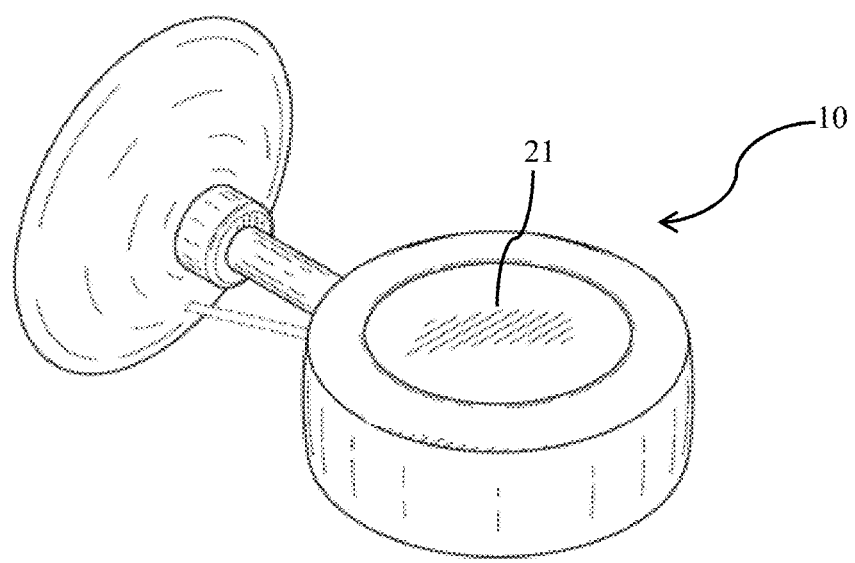
FIG. 9 illustrates a further embodiment of a candle holder of the present disclosure.

Now referring to the figures, wherein like numerals refer to like parts, FIGS. 1 and 2 illustrates an embodiment of a candle holder according to the present disclosure. FIGS. 3 and 4 illustrate another embodiment of a candle holder according to the present disclosure. FIGS. 5 and 6 illustrate yet another embodiment of a candle holder according to the present disclosure. FIGS. 7 and 8 illustrate a further embodiment of a candle holder according to the present disclosure. FIG. 9 illustrates another embodiment of a candle holder according to the present disclosure.

Referring now to FIG. 1, there is shown a perspective view of an embodiment of the present candle holder 10. The embodiment of FIG. 1 is being discussed as a representative embodiment of the candle holder. It should be noted that the same elements appear in each of the respective various embodiments of the candle holders 10, 100, 200 and 300, and the elements are numbered to correspond with the embodiments shown in the figures.

In FIGS. 1, 3, 5 and 7 the candle holder 10, 100, 200, 300 is attached to vertical, smooth surface 50, such as a windowpane, mirror, or the glass surface of a photograph or painting, to name a few. The candle holder 10, 100, 200, 300 can be constructed from any suitable materials, including metals and plastic, and can also be decorated, such as with paint, glitter or designs to enhance the decorative nature of the holder. The candle holder 10, 100, 200, 300 can be constructed to accommodate candles 52 having a variety of shapes and sizes, including tea light candles to pillar candles, including both traditional flame candles and flameless battery-operated candles. In the present embodiments, the candle holders 10, 100, 200, 300 are designed to accommodate both traditional flame and flameless, battery-operated tea light candles 52. An advantage of the embodiments of the present candle holder is that it permits options for decorating and placement of the holder and its candle 52 on vertical surfaces over traditional horizontal surfaces.

The present candle holder 10, 100, 200, 300 comprises a base 12, 112, 212, 312 having an upper wall 14, 114, 214, 314 and an opposing bottom wall 16, 116, 216, 316. The upper wall 14, 114, 214, 314 and bottom wall 16, 116, 216, 316 are connected by a side wall 18, 118, 218, 318 which for the embodiments shown in FIGS. 1 (10), 2, 7 (300) and 8, is a continuous side wall 18, 318 forming the outer circular or oval shape of the holder 10, 300. In other embodiments of the candle holder 100, 200, such as those represented in FIGS. 3, 4, 5 and 6, the upper walls and bottom walls are connected by a plurality of side walls 118, 218 forming the square or rectangular outer shape of the holder. It should be understood that the candle holders of the present disclosure can have a variety of shapes and sizes and are not limited to those shown herein.

As shown in FIG. 1, the upper wall 14, 114, 214, 314 of the present candle holder 10, 100, 200, 300 has a flat surface 14a. The flat surface 14a can further include a decorative element, such as a mirror 114b or other reflector to enhance the light from the candle 52 (FIG. 3). A receptacle 20, 120, 220, 320 is disposed on the flat surface 14a of the upper wall 14, 114, 214, 314. The receptacle 20, 120, 220, 320 further includes a rail 22, 122, 222, 322, adapting the receptacle to accommodate a candle 52 onto the upper wall 14 of the holder. The rail 22, 122, 222, 322 encircles the candle 52, providing an extra level of security and placement of the candle on the holder 52. In an alternative embodiment, the receptacle 20 may be an indentation or well 21 in the top of the upper wall 14, to further assist in placement of the candle 52 onto the holder 10 (FIG. 9). A rail 22 may or may not be included with the indentation 21.

An advantage of the present candle holder is that it is capable of positioning a candle onto a vertical surface 50. Vertical surfaces can include a windowpane, mirror, the front surface of a framed picture or photograph. Ideally, the vertical surface is smooth for accommodating the attachment device 30, 130, 230, 330 of the holder 10, 100, 200, 300. The present candle holder 10, 100, 200, 300 provides options for candle placement from the traditional horizontal surface. Additionally, the various embodiments of the present candle holder 200, 300 allow for placement of multiple candles using a single holder.

To accomplish this goal, the present candle holder 10, 100, 200, 300 includes an attachment device 30, 130, 230 330 which is used to secure the holder to the vertical surface 50. The attachment device 30, 130, 220, 330 includes an arm 32, 132, 232, 323 having a first end 34, 134, 234, 334 connected to a side wall 18, 118, 218, 318 of the holder, and a second end 36 for receiving a fastening element 38, 138, 238, 338. Depending on the embodiment of the candle holder 200, 300, such as that shown in FIGS. 5-7, there may be multiple attachment devices 230, 330 used on the candle holders to secure the holders to the vertical surface 50.

The second end 36, 136, 236, 336 of the arm 32, 132, 232, 332 receives a fastening element 38, 138, 238, 338. In a preferred embodiment, the fastening element 38 is a cup shaped element, such as a rubber vacuum or suction cup, which is useful for easily attaching and detaching the preferred embodiment of a candle holder 10, 100, 200, 300 onto a smooth surface, such as a windowpane, mirror or other vertical glass surface 50. Additionally, the arm 32, 132, 232, 332 extends the candle holder 10, 100, 200, 300 a suitable distance away from the vertical surface 50, which avoids potentially heating the vertical surface if a traditional flame candle is used. The fastening element 38,138, 238, 338 assists in maintaining the preferred embodiment of the candle holder and associated candle in the horizontal position. The candle holder 10 may also include an additional support strut 40, 140, 240, 340), extending from the fastening device 38, 138, 238, 338 to the side wall 18, 118, 218, 318 beneath the arm 30, 130, 230, 330. The strut 40 adds additional support to maintain the holder in the horizontal position.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A holder for a candle comprising:
    a base having an upper wall comprising a top mirrored surface and an opposing bottom wall, the upper wall and the bottom wall connected by a side wall or side walls;
    a circular ring on the top mirrored surface extending around a periphery of the top mirrored surface and configured to hold a candle within the ring on the top mirrored surface so that the candle extends above a top of the ring, the upper wall further having no walls extending upwardly from the upper wall of the base above a top of the circular ring; and
    an arm extending from the side wall of the base, the arm comprising a suction cup on an end of the arm configured to adhere to a surface.

2. The holder of claim 1, wherein the base has a square shape formed from the upper wall, opposing bottom wall and a plurality of side walls.

3. The holder of claim 1, wherein the base has a rectangular shape formed from the upper all, opposing bottom wall and a plurality of side walls.

4. The holder of claim 1, wherein the base has a circular shape formed from the upper wall, opposing bottom wall and a continuous side wall.

5. The holder of claim 1, wherein the base has an oval shape formed from the upper wall, opposing bottom wall and a continuous side wall.

6. The holder of claim 1, wherein the ring is centered on the top surface of the upper wall.

7. A holder for a candle comprising:
    a base having an upper wall having a top surface and an opposing bottom wall, the upper wall and the bottom wall connected by a side wall;
    a plurality of circular rings on the top surface of the upper wall, each ring configured to hold a candle within the ring and on the top surface of the upper wall so that the candle extends above a top of the ring, the upper wall further having no walls extending from the upper wall of the base above a top of the circular ring;
    a first arm extending from the side wall of the base, the first arm comprising a first suction cup on an end of the first arm configured to adhere to a surface; and
    a second arm extending from the side wall of the base, the second arm comprising a second suction cup on an end of the second arm configured to adhere to a surface.

8. The holder of claim 7, wherein the first and second suction cups secure the holder to a vertical smooth surface.

9. A method for positioning a candle holder onto a vertical surface, the method comprising the steps of:
    providing a holder adapted for receiving at least one candle, the holder comprising a base having an upper wall comprising a top mirrored surface and an opposing bottom wall, the upper wall and the bottom wall connected by a side wall, the top mirrored surface further comprising a circular ring extending around a periphery of the top mirrored surface and configured to hold a candle within the ring and on the top mirrored surface so that the candle extends above a top of the ring, the upper wall further having no walls extending upwardly from the upper wall of the base above a top of the circular ring, an arm extending from the side wall of the base, the arm comprising a suction cup on an end of the arm configured to adhere to a surface;
    attaching the holder to a vertical surface through the suction cup; and
    placing a candle within the ring on the top mirrored surface of the upper wall.

10. The method of claim 9, wherein the method further includes detaching the holder from the vertical surface using the suction cup.

11. The method of claim 9, wherein the vertical surface includes a window surface.

12. The method of claim 9, wherein the vertical surface includes a mirror.

\* \* \* \* \*